March 19, 1935.　　　H. J. STEGEMAN　　　1,994,929
LAWN MOWER
Filed Sept. 23, 1932　　6 Sheets-Sheet 1

INVENTOR.
Henry J. Stegeman
BY
ATTORNEYS.

March 19, 1935.  H. J. STEGEMAN  1,994,929
LAWN MOWER
Filed Sept. 23, 1932   6 Sheets-Sheet 2

INVENTOR.
Henry J. Stegeman
BY
ATTORNEYS.

March 19, 1935.  H. J. STEGEMAN  1,994,929
LAWN MOWER
Filed Sept. 23, 1932.   6 Sheets-Sheet 3

INVENTOR.
Henry J. Stegeman
BY
ATTORNEYS.

March 19, 1935.  H. J. STEGEMAN  1,994,929
LAWN MOWER
Filed Sept. 23, 1932    6 Sheets-Sheet 5

INVENTOR.
Henry J. Stegeman
BY
ATTORNEYS.

Patented Mar. 19, 1935

1,994,929

UNITED STATES PATENT OFFICE 1,994,929

LAWN MOWER

Henry J. Stegeman, Fairfield, Conn., assignor to The Locke Steel Chain Company, Bridgeport, Conn., a corporation of Connecticut Application September 23, 1932, Serial No. 634,485

51 Claims. (Cl. 56—7)

This invention relates to a novel and improved form of lawn mower, the novel features of which will be best understood from the following description and the annexed drawings, in which I have shown a selected embodiment of the invention and in which.

The invention finds particular utility in connection with cutting the grass on putting greens or other places where it is desired to keep the grass short and of a uniform height. With this in mind, I have devised the machine so that the weight thereof may be evenly distributed and so that, when one green has been mowed, the machine may be rendered inoperative, transporting wheels attached thereto, and then the machine may be driven to the next green which is to be mowed.

Figure 3:
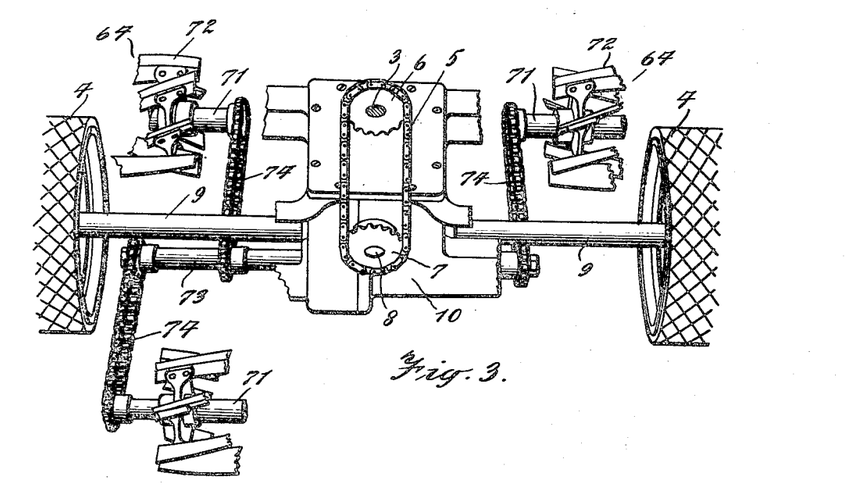
Fig. 3 is a diagrammatic perspective view of the driving connection between the various parts.

The invention is illustrated as comprising a main frame 1 of any suitable construction, supporting thereon a motor 2 having a shaft 3 extending longitudinally of the machine and approximately on the center thereof. The motor and frame are symmetrical, so far as possible, with respect to the longitudinal center thereof and for that matter with respect to the transverse center thereof, so that the weight may be evenly distributed on the various ground-engaging supports. These supports are shown in the form of rollers and casters, the rollers being indicated at 4 and being disposed one on either side of the longitudinal center and equally spaced therefrom. The rollers are driven from the shaft 3 by means of a chain 5, as best shown in Fig. 3, this chain engaging a sprocket 6 on the shaft 3 and a sprocket 7 on a shaft 8 vertically beneath the shaft 3 and parallel thereto. This shaft 8 may drive the rollers 4 through shafts 9 by means of a differential drive contained in a housing 10. This drive may be of any conventional or suitable form, and since the details thereof are not necessary for an understanding of my invention, they have not been shown.

Figure 8:
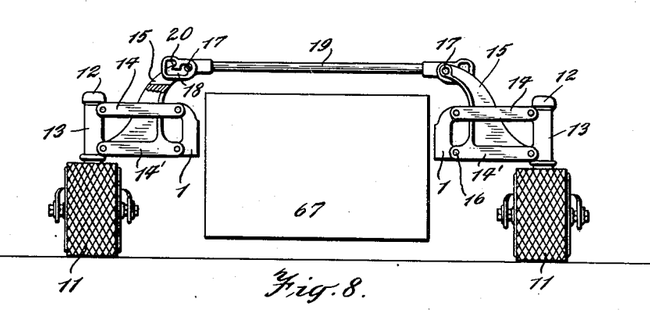
Fig. 8 is a rear view of part of the mechanism showing the casters in one position relative to the frame.
Figure 9:
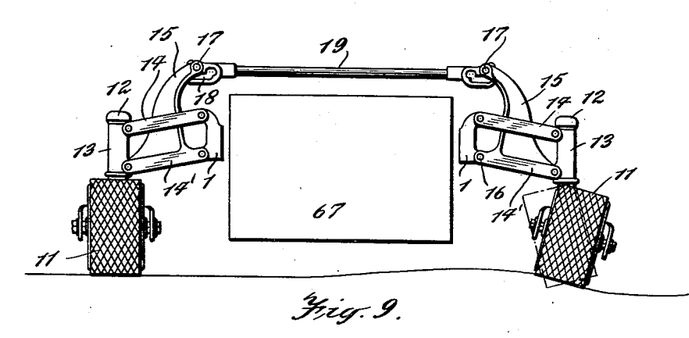
Fig. 9 is a view similar to Fig. 8 but showing the casters in another position with respect to the frame.
Figure 10:
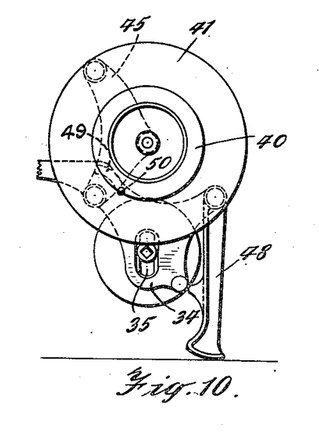
Fig. 10 is an end view of one of the rollers and its associated frame, showing the relation thereof to one of the transporting wheels.
Figure 11:
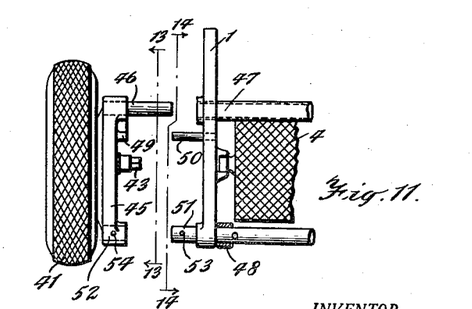
Fig. 11 is a fragmentary top plan view showing one end of one of the rollers and one of the transporting wheels about to be applied thereto.

The casters are shown at 11 and, as best shown in Figs. 8 and 9, they are mounted on vertically extending spindles 12 which are rotatably mounted in bearings 13 supported from the main frame 1 by means of two parallel links 14 and 14', the link 14' being part of the bracket 15, pivoted to the main frame at 16. By this arrangement the bearing 13 and consequently the spindle 12 are always maintained vertical, as will be evident from a comparison of Figs. 8 and 9. Each bracket 15 is provided with an upwardly extending arm, at the uppermost end of which is a pin 17 adapted to be received in a slot 18 of an equalizer bar 19. When in the position shown in Fig. 8, it will be seen that each pin 17 is at the innermost end of the slot 18, which is to say that the two pins 17 are as close together as these slots will permit, whereas in the position shown in Fig. 9 these pins are at the opposite ends of the slots, which means that the brackets 15 have been rotated on their pivots 16 to lower the casters with respect to the frame. Since these casters are normally in engagement with the ground, the result is to lift the frame with respect to the ground and to hold it there, the pins 17 then being held in place and preventing rotation of the brackets 15 by engagement with shoulders 20 (Fig. 8) on the equalizer bar. The pins 17, of course, pivot in the different positions which they occupy in the slots 18 as the casters rise and fall with the unevenness of the ground. By manipulating the bar 19, it may be caused to occupy either the position shown in Fig. 8 or that shown in Fig. 9, as related to the casters.

Figure 2:
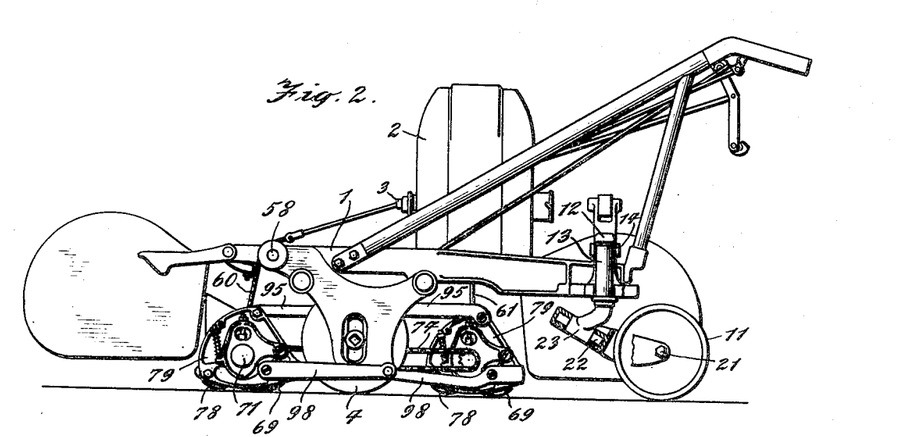
Fig. 2 is a side elevation taken from the left of Fig. 1, but showing the device with the transporting wheels removed.

As best shown in Fig. 2, each caster is mounted on a shaft 21 secured to a pivot 22 rotatably mounted in a bearing 23 secured to the spindle 12. The pivot 22 and its bearing are horizontally extending, although shown as inclined somewhat to the exact horizontal, and therefore the result is that the pivot 22 and the spindle 12 provide a universal movement of each caster.

Figure 12:
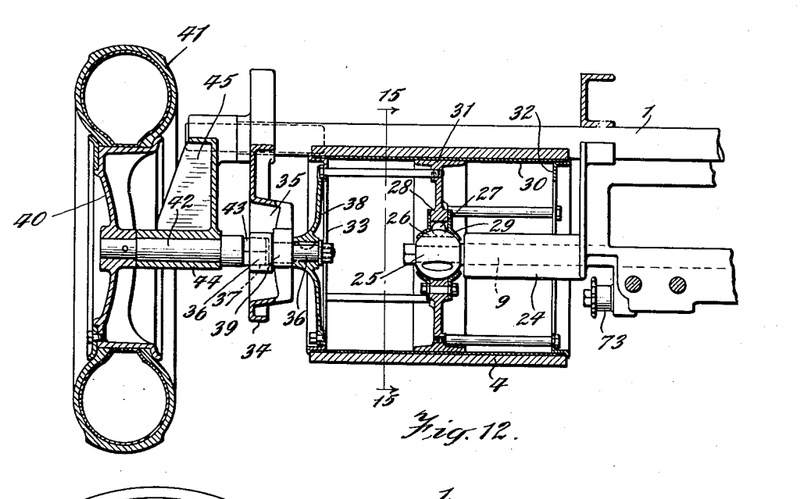
Fig. 12 is a vertical sectional view through one of the supporting rollers and one of the transporting wheels.
Figure 15:
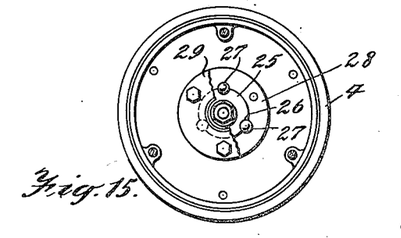
Fig. 15 is a view on the line 15—15 of Fig. 12.

Each roller is shown as mounted in such a way that it may have a universal motion with respect to its axis. The construction which makes this posible is best shown in Figs. 12 and 15, wherein it will be seen that the frame has a bearing 24 on each side thereof within which is disposed one of the shafts 9 and that each of these shafts has adjacent its end a ball 25 having therein longitudinally extending grooves 26 within which are disposed small spherical-shaped keys 27, these keys, in turn, being held in the hub 28 of the roller as by plates 29 engaging opposite sides thereof. By this arrangement, the hub may rotate upon the ball 25 in a direction lengthwise of the axis of the shaft 9 while at the same time the spherical keys 27 give a driving connection between the shaft and the roller. The rest of the roller may be of any suitable construction, although preferably a hollow one, and is here shown as a shell 30 secured to a flange 31 on the hub 28 and having end plates 32 and 33 secured to the hub by bolts, as indicated. In order to permit the longitudinal tipping of a roller as described above, the frame 1 has a depending arm 34, probably best shown in Figs. 12 and 14, and which has therein a vertically extending slot 35 to receive a stub shaft 36 having a squared socket 37 in the end thereof. This stub shaft is secured to the roller as by a plate 38, and preferably this stub shaft is concentric with the shaft 9. The stub shaft 36 may have a squared bearing 39 engaging the walls of the slot 35, and thus it will be seen that free vertical movement of the stub shaft 36 and consequently of the roller 4 is permitted within practical limits while at the same time the roller is maintained in proper alinement with the shaft 9.

Figure 4:
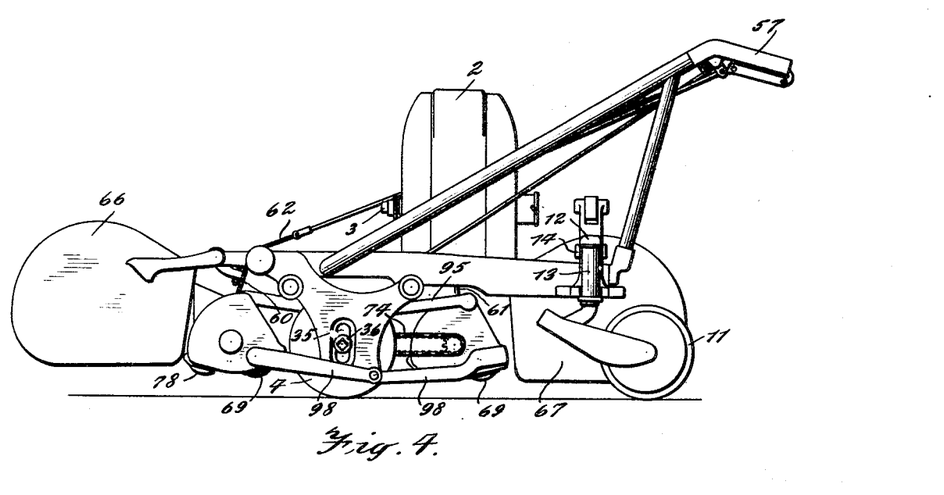
Fig. 4 is a diagrammatic view similar to Fig. 2 but showing certain of the parts in different positions.
Figure 5:
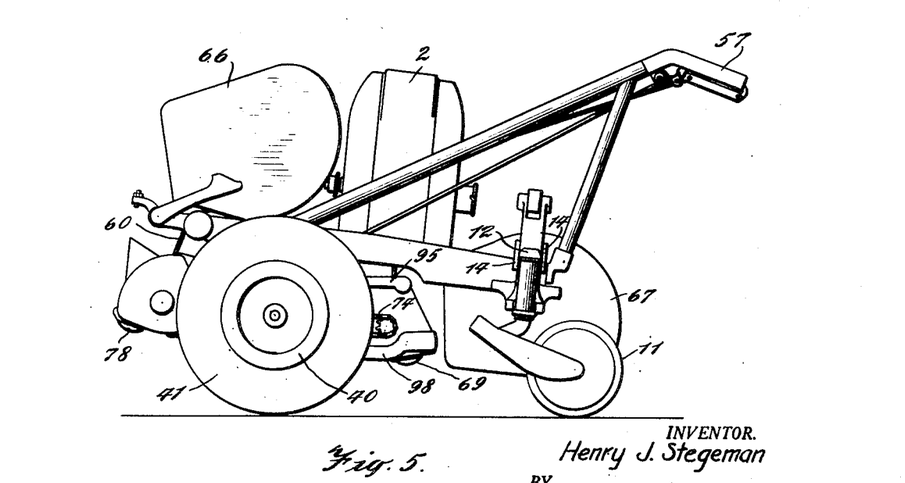
Fig. 5 is a diagrammatic view similar to Figs. 2 and 4 but showing the transporting wheels in place and showing certain of the parts in still other positions.

When the machine is in operation, the casters are in the position shown in Figs. 2, 4, and 8, whereas when it is desired to transport the machine from one place to another, as from one putting green to another, the casters are brought to the position shown in Figs. 5 and 9, thus raising the rear part of the frame. When that is done, I also provide means for supporting the rest of the frame on transporting wheels, these wheels being indicated at 40. As shown, these wheels are of the disk type and carry pneumatic tires 41, although, of course, other convenient forms may be used. As best shown in Figs. 10, 11, 12, and 13, each wheel has a shaft 42 provided with a squared end 43 adapted to be received within the socket 37. This shaft is rotatably mounted in a bearing 44 on a sub-frame 45 having a pin 46 extending therefrom in the direction of the roller. The main frame of the machine may conveniently be formed in part of transversely extending tubes, one of which is shown at 47 and which may conveniently be used as a bearing for the pin 46, and the parts may be so arranged that this pin is at the same distance from the center of the shaft 42 as is the center of the tube 47 from the center of the shaft 36. By this arrangement, the sub-frame and the wheel carried thereby may be rotatably mounted on the tubular member 47 of the main frame.

Figures 13, 14:
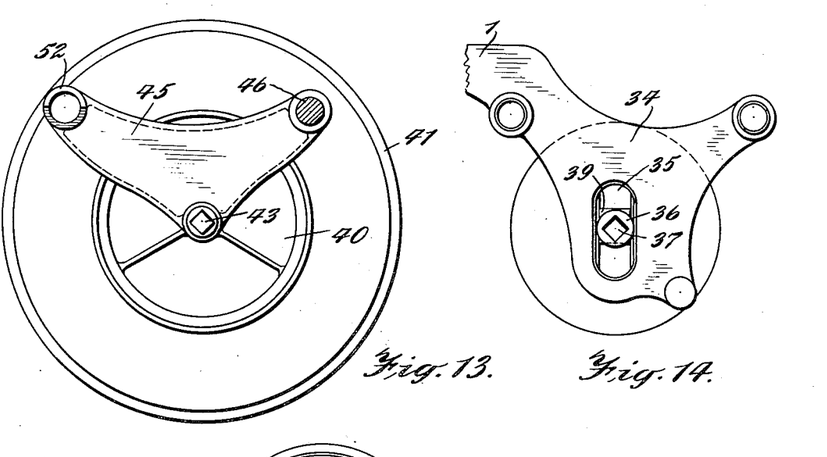
Fig. 13 is a view on the line 13—13 of Fig. 11.
Fig. 14 is a view on the line 14—14 of Fig. 11.

When it is desired to place a wheel 40 in position, the machine may be lifted by any suitable means, and then a supporting jack may be used to hold the machine in lifted position. In this form, this jack is shown as a leg 48 pivoted to the main frame and adapted to be swung downwardly into the position shown in Fig. 10 and thus temporarily support the frame. The sub-frame 45 may be, if desired, carried in the position shown in Fig. 10 or may be taken off from the frame entirely if preferred. When in the position shown in Fig. 10, an arcuate stop 49 on the sub-frame may engage a stop pin 50 on the main frame to limit rotation of the sub-frame and to support its wheel in inoperative position. Then, when it is desired to mount the wheel in operative position, the sub-frame may be pulled outwardly until these two members 49 and 50 are out of registry and the sub-frame then swung on the pivot formed by the members 46 and 47 until the squared end 43 is in position to be pushed into the socket 37. In Figs. 12, 13, and 14, the members 49 and 50 have been omitted, as they may be if desired. When the squared end 43 is in line with the socket 37, then the sub-frame may be pushed towards the main frame until a pin 51 on the main frame enters a socket 52 on the sub-frame, and then a locking pin (not shown) may be placed in alined openings 53 and 54 on these two members to hold the parts in place. The parts 49 and 50 are preferably so arranged that when the sub-frame is pushed towards the main frame, these parts will come into contact before the parts 51 and 52. Then, upon rotation of the sub-frame about the tube 47, the parts 49 and 50 will come out of engagement at about the time when the parts 51 and 52 come in line with each other. The part 52 may be in the form of a semi-cylindrical stop, as shown in Fig. 13, so as to engage the top of the pin 51 to stop rotation of the sub-frame on the main frame when the axes of the shafts 36 and 42 coincide.

Figure 1:
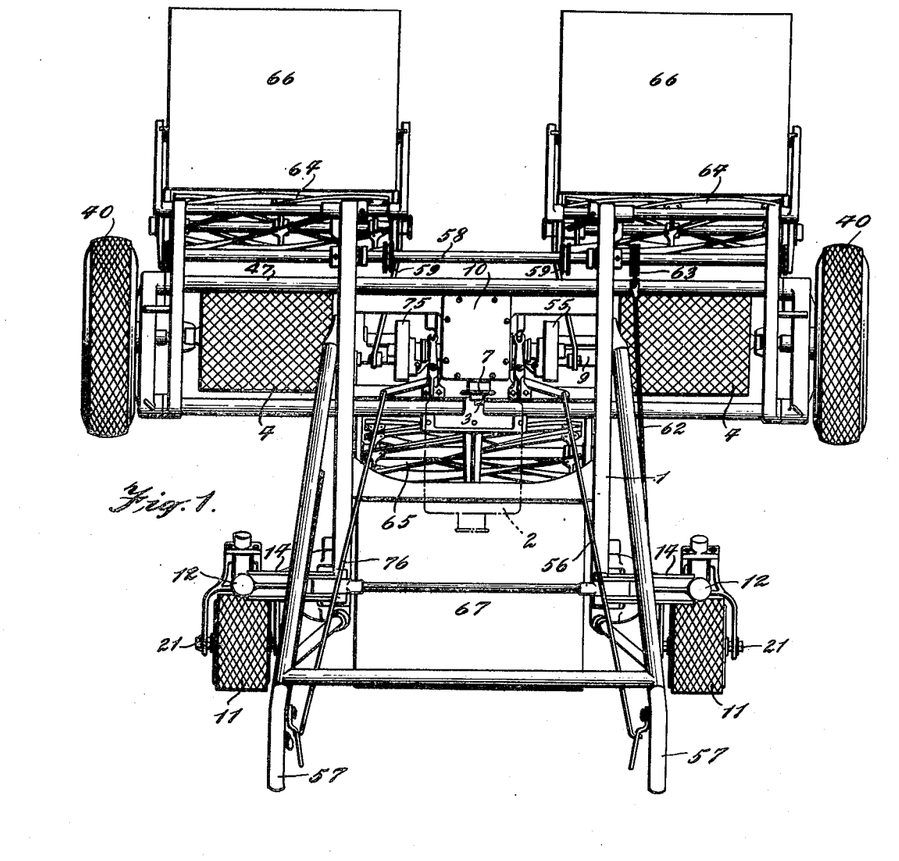
Fig. 1 is a top plan view of one form which the invention may take.

When the wheels are placed in position on the frame so as to support the frame, then, of course, the jacks 48 are swung out of operative position and the machine may be transported to the next place where it is to be used, being supported during this transportation upon the wheels 40 and the casters 11. The rollers 4 are preferably power driven through the differential mechanism referred to above, and this mechanism may be controlled by a clutch 55 (Fig. 1) operated by a rod 56 adjacent one of the handles 57 used to guide the machine. This clutch may be of the general form more fully described and claimed in the copending application of Sylvanus D. Locke and Henry J. Stegeman, Serial No. 299,658, Patent No. 1,886,408, and since the details are not essential to an understanding of this invention, they will not be further described. When the wheels 40 are in place, they will be controlled by the same mechanism.

Supported in part on the main frame are a plurality of cutters, here shown as one cutter in front of each of the rollers 4 and one cutter behind the space between the rollers 4, the knives or cutting blades of the respective cutters overlapping so as to cut one swath. These cutters are pivotally mounted on the frame by means which will be described presently, and preferably a single means is provided for elevating and lowering them. For example, in Fig. 2, the cutters are all in engagement with the ground and in operative position, whereas in Fig. 4 they have all been raised out of engagement with the ground and into an inoperative position. Then in Fig. 5 the casters 11 have been manipulated, as described above, to lift part of the frame, and the transporting wheels 40 have likewise been attached so that the frame is now in condition to be transported to the next place to be mowed.

The means for lifting the mowers may comprise a shaft 58 extending transversely of the frame and carrying a plurality of pulleys 59, one for each end of each cutter, and around each of which runs a cable connected to a cutter frame. In Figs. 2, 4, and 5 is shown a cable 60 connected to one of the side cutters, and a similar cable 61 is shown as connected to the rear cutter. The shaft 58 may be rotated by means of a cable 62 connected to a pulley 63 on that shaft and operated from one of the handles 57.

Figure 6:
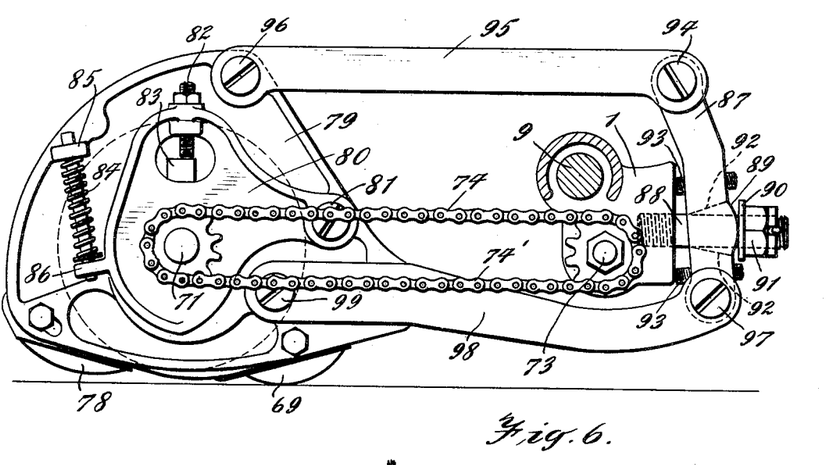
Fig. 6 is a view on an enlarged scale showing the connections between one of the cutters and the main frame.

Each of the cutters is connected to the main frame by a novel arrangement, best shown in Fig. 6 in which the connection is shown for one of the side cutters, although a similar arrangement may be used for the rear cutter except that, as will be obvious to one skilled in the art, the arrangement will be reverse to what appears in Fig. 6. For the purpose of convenience, I may designate the side cutters 64 and the rear cutter 65, as in Fig. 1, the side cutters being provided with containers 66 into which the grass is thrown forwardly by suitable deflecting means known in the art and not shown herein, whereas the cutter 65 is provided with a similar container 67 into which the cut grass is thrown rearwardly, as is well known in the art. The cutter shown in Fig. 6 is one of the cutters 64, and parts of this cutter are also shown in Fig. 7.

Figure 7:
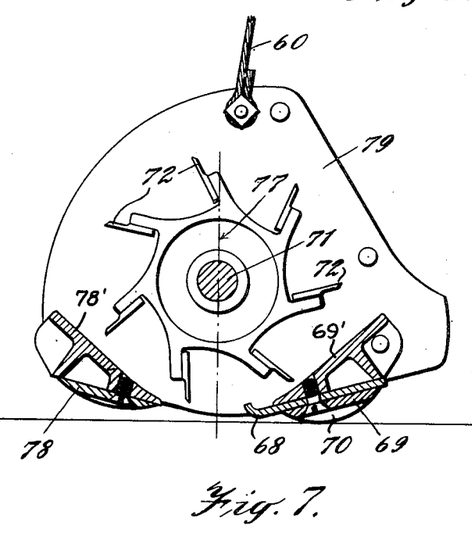
Fig. 7 is a vertical sectional view through one of the cutters.

Referring now particularly to Fig. 7 and also incidentally to Figs. 2, 4, 5, and 6, it will be seen that each cutter is provided with two ground-engaging shoes. The several cutters are of similar construction, and therefore a description of one of them will suffice.

As best shown in Fig. 7, each cutter may be provided with a stationary knife 68 secured to a ground-engaging shoe 69 mounted on a part 69' of the cutter frame and having grooves 70 therein extending in the direction of travel. This grooved shoe is shown as of the type described and claimed in the said copending application 299,658, Patent No. 1,886,408, although ungrooved shoes may be used if desired. The stationary knife or blade is supported close to the ground, the distance above the ground possibly being slightly exaggerated in Fig. 7. Each cutter also comprises a rotary shaft 71 carrying a plurality of knives or blades thereon, as indicated at 72. These blades cooperate with the stationary blade or knife, as is well known in the art, and the shafts 71 on the various cutters may be driven from the shaft 73 (Figs. 3 and 6) by means of sprocket chains 74 engaging sprockets on the respective shafts. The driving of the cutters may be controlled by means of a clutch 75 (Fig. 1) operated from one of the handles 57 by means of a rod 76, in a manner more fully described and claimed in said copending application 299,658, Patent No. 1,886,408. Both the clutches 55 and 75 have been omitted from Fig. 3, to avoid confusion in that figure.

In Fig. 7, the cutter shown therein is normally moving towards the left, and the stationary blade 68 is disposed to the rear of a vertical plane 77 passing through the axis of the shaft 71. Disposed in front of this plane 77 is a second ground-engaging shoe 78 mounted on a part 78' of the cutter frame and preferably spaced from that plane a distance equal to the distance of the shoe 69, so that these two shoes are disposed symmetrically about said vertical plane 77. By this arrangement, the two shoes, or rather the parts 69' and 78' on which they are mounted, form a relatively narrow opening therebetween through which the grass may be cut. Part of this space is occupied by the knife 68, which of course narrows the opening still further.

It should be borne in mind that the machine forming the subject matter of this application is particularly adapted for mowing short grass, such as on a putting green of a golf course where the mowing takes place daily and the grass is not permitted to attain any substantial height.

The shoe 78 is likewise shown grooved in the direction of travel, as is the shoe 69, although here also other types may be used. The grass, being short, will not be broken down by the shoe 78, as might be the case with tall grass. The arrangement of the two shoes with respect to the ground when the ground is level is best shown in Figs. 6 and 7, wherein it is seen that the rear shoe 69 is the one which contacts with the ground, whereas the front shoe 78 is disposed above the ground a short distance, probably exaggerated slightly in Fig. 7. When a concave surface is being mowed, the forward shoe 78 will engage that surface and serve to support the cutter, whereas when a convex surface is being mowed, the cutter will be supported on the rear shoe 69. These two shoes being closely spaced and being either in engagement with the ground or closely adjacent thereto, sharply limit the amount of tipping or rocking movement of the cutter on either shoe, thereby insuring a substantially constant uniformity of height of cut, since the cutter cannot rotate on either shoe to any substantial extent. At the same time, a slight adjustment is permitted, by means to be presently described.

Another advantage of the arrangement just described is that there is prevented the so-called "scalping" of humps or other rises on a lawn which is caused by the fact that, when a cutter passes over a hump, the cutting blades are permitted to drop closer to the ground. Such dropping of the blades is prevented in this case by the shoe 78. The vertical position of the shoes 69 and 78, or their positions relative to the ground, can under some conditions be reversed and obtain the same results.

Each cutter comprises a cutter frame 79, and preferably the shaft 71 is supported in brackets 80 pivoted at 81 on the cutter frame and adjustably held against movement towards the stationary knife or blade 68 by means of an adjusting screw 82 threaded through the bracket and engaging a fixed stop 83 upon the cutter frame. Movement of the rotary blades away from the stationary blade is permitted against the action of a spring 84 operating between a lug 85 on the cutter frame and a lug 86 on the bracket. The stop 83 and the adjusting screw 82 act substantially in line with the shaft 71, as more fully described and claimed in the aforesaid copending application 299,658, Patent No. 1,886,408.

Each cutter is preferably mounted by means best shown in Fig. 6, in which is shown one of the side or forward cutters, it being understood that similar means is used for any of the cutters which may be pulled by the machine, instead of being pushed as in Fig. 6. When pulled instead of pushed, a substantially identical arrangement will be used except that it will be reversed from what is shown in Fig. 6.

Each cutter may be supported from the main frame 1 by means of a vertically extending frame member 87 forming in effect part of the main frame, but adjustable thereon. This frame member may be secured to the main frame as by means of a bolt 88 passing through an opening in the member and threaded into the main frame.

The member is shown as having a cylindrical-shaped rear surface 89 contacting with a washer 90 beneath a head 91 of the bolt, this head being shown in the present instance as a nut threaded on the bolt and thus forming an adjustment means. The hole through the member 87 preferably has a central axis which is radial to the surface 89 and passes through the center of that surface, and the hole has opposite tapering surfaces 92 so that as the member is tipping upon the bolt 88, any part of the surface 89 will engage the washer 90 beneath the head of the bolt. This tipping may be effected by means of a pair of adjusting screws 93 disposed one on either side of the bolt and engaging the main frame 1.

At its upper end, the member 87 has a pivot 94 to which is connected a link 95 connected at its forward end to a pivot 96 upon the upper part of the cutter frame 79. At the lower end of the member 87 is another pivot 97 on which is a link 98 connected at its forward end to a pivot 99 on the cutter frame. The pivots and links are preferably so arranged that the distances between the pivots 94 and 96, and between the pivots 97 and 99, are equal, and so that the lines drawn through the centers of these pivots along the links are parallel to each other. Similarly, the lines drawn through the pivots 94 and 97, and 96 and 99, respectively, are parallel to each other so that the geometric figure 94—96—99—97—94 is a parallelogram. Preferably, the upper link 95 is omitted at one side of the cutter frame, thus permitting each cutter to accommodate itself to inequalities in the ground over which it passes, by tipping lengthwise of the shaft 71. The reasons for this are more fully described and the structures claimed in the aforesaid copending application 299,658, Patent No. 1,886,408.

By the above parallelogram construction it will be seen that any movement of the cutter, due to inequalities in the ground, will be in a vertical direction, and therefore the height of cut will not be affected. Both strands of the chain 74 are also disposed substantially parallel to lines through the pivots 99 and 97, and the pivots 96 and 94, respectively, and, in fact, two other parallelograms are formed, which may be conveniently defined as geometric figures 71—96—94—73—71 and 71—73—97—99—71. This arrangement prevents lifting of the cutter by the force exerted by the driving chain.

While I have shown the invention as embodied in a specific form, it is to be understood that various changes in details may be made without departing from the scope of the invention, and I therefore do not intend to limit myself except by the appended claims.

I claim:

1. A lawn mower comprising a frame, rollers supporting said frame and having bearings therein and disposed adjacent opposite sides thereof, a cutter disposed in front of each of said rollers and having blades extending beyond the edges thereof transversely of the direction of travel, a cutter disposed rearwardly of said rollers and having blades overlapping the blades of said first-named cutters, means connecting said cutters to said frame to move therewith, and means for operating all of said cutters from said frame.

2. A lawn mower comprising a frame, a plurality of rollers supporting said frame and having bearings therein, a cutter disposed in front of each of said rollers and having blades extending laterally beyond the edges thereof in a direction transversely of the direction of travel, means connecting said cutters to said frame to move therewith, and means on said frame operating said cutters.

3. A lawn mower comprising a frame, a plurality of rollers supporting said frame, a cutter disposed in front of each of said rollers and having blades extending laterally beyond the edges thereof in a direction transversely of the direction of travel, means connecting said cutters to said frame to move therewith, means on said frame operating said cutters, said cutters being spaced apart laterally, and another cutter connected to said frame and having blades so positioned as to close said space.

4. A lawn mower comprising a frame, rollers supporting said frame and having bearings therein and disposed adjacent opposite sides thereof, a cutter disposed in front of each of said rollers and having blades extending beyond the edges thereof transversely of the direction of travel, a cutter disposed rearwardly of said rollers and having blades overlapping the blades of said first-named cutters, means connecting said cutters to said frame to move therewith, means for operating all of said cutters from said frame, and a supporting caster on said frame rearwardly of each of said rollers.

5. A lawn mower comprising a frame, rollers supporting said frame and having bearings therein and disposed adjacent opposite sides and adjacent the front thereof, a cutter disposed in front of each of said rollers and having blades extending beyond the edges thereof transversely of the direction of travel, a cutter disposed rearwardly of said rollers and having blades overlapping the blades of said first-named cutters, means connecting said cutters to said frame to move therewith, means for operating all of said cutters from said frame, and supporting casters disposed adjacent the rear of the frame.

6. A lawn mower comprising a frame, rollers supporting said frame and disposed adjacent opposite sides thereof, a cutter disposed in front of each of said rollers and having blades extending beyond the edges thereof transversely of the direction of travel, a cutter disposed rearwardly of said rollers and having blades overlapping the blades of said first-named cutters, means connecting said cutters to said frame to move therewith, and means for operating all of said cutters from said frame, each of said cutters comprising a ground engaging element carrying the greater part of the weight of the cutter.

7. A lawn mower comprising a frame, rollers supporting said frame and disposed adjacent opposite sides thereof, a cutter disposed in front of each of said rollers and having blades extending beyond the edges thereof transversely of the direction of travel, a cutter disposed rearwardly of said rollers and having blades overlapping the blades of said first-named cutters, means connecting said cutters to said frame to move therewith, means for operating all of said cutters from said frame, each of said cutters comprising a ground engaging element carrying the greater part of the weight of the cutter, and a supporting caster on said frame rearwardly of each of said rollers.

8. In a lawn mower, a cutter comprising a stationary blade, means for supporting said blade adjacent the ground, a rotary blade mounted above said stationary blade and adapted to coact therewith, and ground-engaging shoes disposed on opposite sides of the cutting edge of said stationary blade.

9. In a lawn mower, a cutter comprising a stationary blade, means for supporting said blade adjacent the ground, a rotary blade mounted above said stationary blade and adapted to coact therewith, and ground-engaging shoes disposed on opposite sides of the cutting edge of said stationary blade at substantially equal distances from a vertical plane through the axis of said rotary blade.

10. In a lawn mower, a cutter comprising a stationary blade, means for supporting said blade adjacent the ground, a rotary blade mounted above said stationary blade and adapted to coact therewith, and ground-engaging shoes disposed on opposite sides of the cutting edge of said stationary blade and grooved in the direction of travel of the mower.

11. In a lawn mower, a cutter comprising a stationary blade disposed adjacent the ground, a rotary blade having an axis disposed above said stationary blade, said blades coacting to cut grass therebetween, and means forming a narrow opening in front of said stationary blade and through which grass may project.

12. In a lawn mower, a cutter comprising a stationary blade disposed adjacent the ground, a rotary blade having an axis disposed above said stationary blade, said blades coacting to cut grass therebetween, means forming a narrow opening in front of said stationary blade and through which grass may project, and ground-engaging means closely adjacent the rear of said stationary blade.

13. In a lawn mower, a cutter comprising a stationary blade disposed adjacent the ground, a rotary blade having an axis disposed above said stationary blade, said blades coacting to cut grass therebetween, means forming a narrow opening in front of said stationary blade and through which grass may project, and ground-engaging means closely adjacent the rear of said stationary blade and in front thereof.

14. A lawn mower having a frame, one or more cutters connected to said frame, a plurality of casters partly supporting said frame and vertically movable with respect thereto, and equalizing means connecting said casters and adapted to equalize the weight carried thereby in different positions of said casters relative to the frame.

15. A lawn mower having a frame, one or more cutters connected to said frame, a plurality of casters pivoted to said frame on horizontally disposed pivots, and equalizing means connecting said casters and adapted to equalize the weight carried thereby in different positions of said casters relative to the frame.

16. A lawn mower having a frame, one or more cutters connected to said frame, a pair of brackets pivoted to said frame on horizontally disposed pivots, a caster pivoted to each of said brackets, and a bar pivotally connecting said brackets to cause pivotal movement of one of them to be transmitted to the other.

17. A lawn mower having a frame, one or more cutters connected to said frame, a pair of brackets pivoted to said frame on horizontally disposed pivots, a caster mounted on each bracket and having universal movement with respect thereto, and a bar pivotally connecting said brackets to cause pivotal movement of one of them to be transmitted to the other.

18. A lawn mower having a frame, one or more cutters connected to said frame, a pair of casters each having a spindle mounted in a vertical bearing, a pair of vertically spaced parallel links pivotally connecting each bearing to said frame and forming, with said bearing and said frame, a parallelogram, and a bar pivotally connecting said bearings to cause vertical movement of one of them to be transmitted to the other.

19. A lawn mower having a frame, one or more cutters connected to said frame, a caster supporting part of said frame and having a spindle mounted in a vertical bearing, and a pair of parallel links pivotally connecting said bearing to said frame and forming, with said bearing and said frame, a parallelogram.

20. A lawn mower having a frame, one or more cutters connected to said frame, a caster supporting part of said frame and having a spindle mounted in a vertical bearing, a pair of parallel links pivotally connecting said bearing to said frame and forming, with said bearing and said frame, a parallelogram, a horizontally extending bearing on said spindle, and a shaft rotatable in said bearing and supporting said caster.

21. A lawn mower comprising a frame, one or more rollers having bearings in said frame, a plurality of casters partly supporting said frame, a cutter supported on said frame, and means to lift said frame and cutter with respect to said casters, said lifting of the frame rotating the frame on said bearings.

22. A lawn mower comprising a frame, one or more rollers having bearings in said frame, a plurality of casters partly supporting said frame, a cutter supported on said frame, and means to lift said frame and cutter with respect to said casters without disturbing the contact of the casters with the ground, said lifting of the frame rotating the frame on said bearings.

23. A lawn mower comprising a frame, one or more cutters connected to said frame, a roller supporting said frame and having an extended ground-engaging surface parallel to its axis, a universal joint rotatably supporting said frame on said roller and means limiting rotation of the roller with respect to the shaft substantially to a vertical plane passing through the axes of the roller and the shaft.

24. A lawn mower comprising a frame having a fixed bearing thereon, one or more cutters connected to said frame, a shaft rotatably mounted in said bearing, a ground-engaging roller, and means supporting said roller on said shaft centrally of the roller and permitting tipping of the roller in a plane parallel to said shaft.

25. A lawn mower comprising a frame having a fixed bearing thereon, one or more cutters connected to said frame, a shaft rotatably mounted in said bearing, a ground-engaging roller, means supporting said roller on said shaft centrally of the roller and permitting tipping of the roller in a plane parallel to said shaft, and means on the frame holding said roller in vertical alinement.

26. A lawn mower comprising a frame having a fixed bearing thereon, one or more cutters connected to said frame, a shaft rotatably mounted in said bearing and having a ball thereon, a roller having a bearing engaging said ball, whereby the roller may rotate on said ball, and means limiting said rotation substantially to a plane passing through the axes of said roller and shaft.

27. A lawn mower comprising a frame having a fixed bearing thereon, one or more cutters connected to said frame, a shaft rotatably mounted in said bearing and having a ball thereon, a roller having a bearing engaging said ball, whereby the roller my rotate on said ball, means limiting said rotation substantially to a plane passing through the axes of said roller and shaft, and means forming a driving connection between said ball and roller.

28. A lawn mower comprising a frame having a fixed bearing thereon, one or more cutters connected to said frame, a shaft rotatably mounted in said bearing and having a ball thereon, a roller having a bearing engaging said ball, whereby the roller may rotate on said ball, means limiting said rotation to a direction lengthwise of the axis of the shaft, and means forming a driving connection between said ball and roller and comprising spherical-shaped keys mounted in grooves in the ball extending parallel to said axis of the shaft.

29. A lawn mower comprising a main frame, a cutter unit comprising a cutter frame, means supporting the main frame above the ground, and a pair of parallel links of equal length pivoted to the main frame and to the cutter frame and extending generally parallel to the direction of movement of the lawn mower and forming, with the main and cutter frames, a parallelogram.

30. A lawn mower comprising a main frame, a cutter unit comprising a cutter frame, means supporting the main frame above the ground, a pair of parallel links of equal length pivoted to the main frame and to the cutter frame and extending generally parallel to the direction of movement of the lawn mower and forming, with the main and cutter frames, a parallelogram, said cutter comprising a rotary blade, and means to drive said blade from the main frame comprising a chain having its tight side substantially parallel to said links and forming a parallelogram with each of said links and said frames.

31. A lawn mower having a main frame comprising a vertically extending frame member, means pivotally supporting said member with respect to the rest of the main frame, a pair of parallel links pivoted to said member on opposite sides of said pivot, a cutter frame pivotally connected to said links, said member, cutter frame and links forming a parallelogram, and a cutter mounted on said cutter frame.

32. A lawn mower having a main frame comprising a vertically extending frame member, means pivotally supporting said member with respect to the rest of the main frame, a pair of parallel links pivoted to said member on opposite sides of said pivot, a cutter frame pivotally connected to said links, said member, cutter frame and links forming a parallelogram, a cutter mounted on said cutter frame, and means for adjustably holding said member in fixed position on its pivot.

33. A lawn mower comprising a frame, one or more rollers having bearings in said frame, a plurality of casters partly supporting said frame, a cutter supported on said frame, means to lift said frame and cutter with respect to said casters, said lifting of the frame rotating the frame on said bearings, and means for holding said frame and cutter in elevated position with respect to said casters.

34. A lawn mower having a frame, one or more cutters connected to said frame, a pair of brackets pivoted to said frame on horizontally disposed pivots, a caster pivoted to each of said brackets, a bar extending between said brackets, and means forming a plurality of pivotal connections between said bar and each of said brackets, whereby the bar may be pivotally connected to each bracket at any one of a plurality of pivots.

35. A lawn mower having a frame, one or more cutters connected to said frame, a pair of brackets pivoted to said frame on horizontally disposed pivots, a caster pivoted to each of said brackets, a bar extending between said brackets, a slot at each end of said bar, and a pin on each bracket received in said slot, said slot having walls with configurations adapted to hold one of said pins in a selected position therein to form a pivotal connection between the bar and the bracket on which the pin is located.

36. A lawn mower having a main frame comprising a vertically extending frame member, said member having a pivotal connection to the rest of the main frame intermediate the ends of said member, a pair of links each pivoted at one end thereof to one end of said member, a cutter frame pivotally connected to said links at the opposite ends thereof, and a cutter mounted on said cutter frame.

37. A lawn mower having a main frame comprising a vertically extending frame member, said member having a pivotal connection to the rest of the main frame intermediate the ends of said member, a pair of parallel links each pivoted at one end thereof to one end of said member, a cutter frame pivotally connected to said links at the opposite ends thereof, and a cutter mounted on said cutter frame.

38. A lawn mower having a main frame comprising a vertically extending frame member, said member having a pivotal connection to the rest of the main frame intermediate the ends of said member, a pair of links each pivoted at one end thereof to one end of said member, a cutter frame pivotally connected to said links at the opposite ends thereof, means for adjusting said member about its pivot and for holding it in adjusted position, and a cutter mounted on said cutter frame.

39. A lawn mower having a main frame comprising a vertically extending frame member, said member having a hole therein, a bolt passing through said hole and secured to another portion of the main frame, said hole having tapered sides, and a curved surface extending between said tapered sides, with said tapered sides substantially radial to said surface, a head on said bolt engaging said surface, a cutter frame pivotally connected to said member, and a cutter mounted on said cutter frame.

40. A lawn mower having a main frame comprising a vertically extending frame member, said member having a hole therein, a bolt passing through said hole and secured to another portion of the main frame, said hole having tapered sides, a curved surface extending between said tapered sides, with said tapered sides substantially radial to said surface, a head on said bolt engaging said surface, adjusting screws threaded through said member on opposite sides of said hole and engaging said other portion of the main frame, a cutter frame pivotally connected to said member, and a cutter mounted on said cutter frame.

41. In combination, a lawn mower having a roller normally engaging the ground and a main frame supported on said roller, together with a cutter connected to said frame and adapted to be brought into operative relation to the ground when said roller is in engagement with the ground, and means to render said roller and cutter inoperative, said means comprising a wheel of larger diameter than the roller, and means to detachably secure said wheel to said frame coaxially with said roller.

42. In combination, a lawn mower having a roller normally engaging the ground and a main frame supported on said roller, together with a cutter connected to said frame and adapted to be brought into operative relation to the ground when said roller is in engagement with the ground, and means to render said roller and cutter inoperative, said means comprising a wheel of larger diameter than the roller, means to detachably secure said wheel to said frame coaxially with said roller, and means to drive said wheel from said roller.

43. In combination, a lawn mower comprising a frame and cutters connected thereto, two rollers disposed adjacent opposite sides of said frame and supporting it, a motor on said frame, means to drive said rollers from said motor and including a differential connection therebetween, and means to render said rollers and cutters inoperative, said means comprising two wheels of larger diameters than the rollers, means to detachably secure said wheels to said frame coaxially of the rollers, and means to drive said attached wheels from the motor through said differential connection.

44. In combination, a lawn mower having a roller normally engaging the ground and a main frame supported on said roller, together with a cutter connected to said frame and adapted to be brought into operative relation to the ground when said roller is in engagement with the ground, said main frame comprising a tube extending generally parallel to the axis of said roller, and means to render said roller and cutter inoperative, said means comprising a wheel of substantially larger diameter than the roller, a sub-frame on which said roller is rotatably mounted, and a pin on said sub-frame adapted to be received in said tube to aid in centering said wheel, said wheel when thus centered being disposed substantially coaxially with said roller.

45. In combination, a lawn mower having a roller normally engaging the ground and a main frame supported on said roller, together with a cutter connected to said frame and adapted to be brought into operative relation to the ground when said roller is in engagement with the ground, said main frame comprising a tube extending generally parallel to the axis of said roller, and means to render said roller and cutter inoperative, said means comprising a wheel of substantially larger diameter than the roller, a sub-frame on which said roller is rotatably mounted, and a pin on said sub-frame adapted to be received in said tube to aid in centering said wheel, said wheel when thus centered being disposed substantially coaxially with said roller, a second tube forming part of said main frame, and means on said second tube to secure said sub-frame thereto for the purpose set forth.

46. In combination, a lawn mower having a roller normally engaging the ground and a main frame supported on said roller, together with a cutter connected to said frame and adapted to be brought into operative relation to the ground when said roller is in engagement with the ground, and means to render said roller and cutter inoperative, said means comprising a sub-frame, a wheel mounted on said sub-frame and of substantially larger diameter than said roller, and means to pivotally mount said sub-frame on said main frame in position to swing the axis of the wheel into alignment with the axis of the roller.

47. In combination, a lawn mower having a roller normally engaging the ground and a main frame supported on said roller, together with a cutter connected to said frame and adapted to be brought into operative relation to the ground when said roller is in engagement with the ground, and means to render said roller and cutter inoperative, said means comprising a sub-frame, a wheel mounted on said sub-frame and of substantially larger diameter than said roller, means to pivotally mount said sub-frame on said main frame in position to swing the axis of the wheel into alignment with the axis of the roller, and means stopping rotation of the sub-frame on the main frame when said axes are coincident.

48. In combination, a lawn mower having a roller normally engaging the ground and a main frame supported on said roller, together with a cutter connected to said frame and adapted to be brought into operative relation to the ground when said roller is in engagement with the ground, and means to render said roller and cutter inoperative, said means comprising a sub-frame, a wheel mounted on said sub-frame and of substantially larger diameter than said roller, and means to pivotally mount said sub-frame on said main frame in position to swing the axis of the wheel into alignment with the axis of the roller, said means comprising a pin on one frame and a bearing in the other frame in which said pin is slidably received, and means limiting movement of one frame towards the other.

49. In combination, a lawn mower having a roller normally engaging the ground and a main frame supported on said roller, together with a cutter connected to said frame and adapted to be brought into operative relation to the ground when said roller is in engagement with the ground, and means to render said roller and cutter inoperative, said means comprising a sub-frame, a wheel mounted on said sub-frame and of substantially larger diameter than said roller, means to pivotally mount said sub-frame on said main frame in position to swing the axis of the wheel into alignment with the axis of the roller, and means to hold the wheel in inoperative position on the main frame.

50. In combination, a lawn mower having a roller normally engaging the ground and a main frame supported on said roller, together with a cutter connected to said frame and adapted to be brought into operative relation to the ground when said roller is in engagement with the ground, and means to render said roller and cutter inoperative, said means comprising a sub-frame, a wheel mounted on said sub-frame and of substantially larger diameter than said roller, means to pivotally mount said sub-frame on said main frame in position to swing the axis of the wheel into alignment with the axis of the roller, means stopping rotation of the sub-frame on the main frame when said axes are coincident, and a stop adapted to be engaged by said sub-frame on said pivot to hold the wheel in inoperative position.

51. A lawn mower comprising a frame, one or more cutters connected to said frame, a roller having an extended ground-engaging surface parallel to its axis, a shaft having a bearing in said frame, and a universal driving connection between said roller and said shaft adapted to support said shaft from said roller and to permit deviation of the axis of the roller from the axis of the shaft.

HENRY J. STEGEMAN.